Jan. 18, 1966   J. K. SCHOLZ   3,229,542
POWER KNEE ELEVATE
Filed Dec. 30, 1963   2 Sheets-Sheet 1
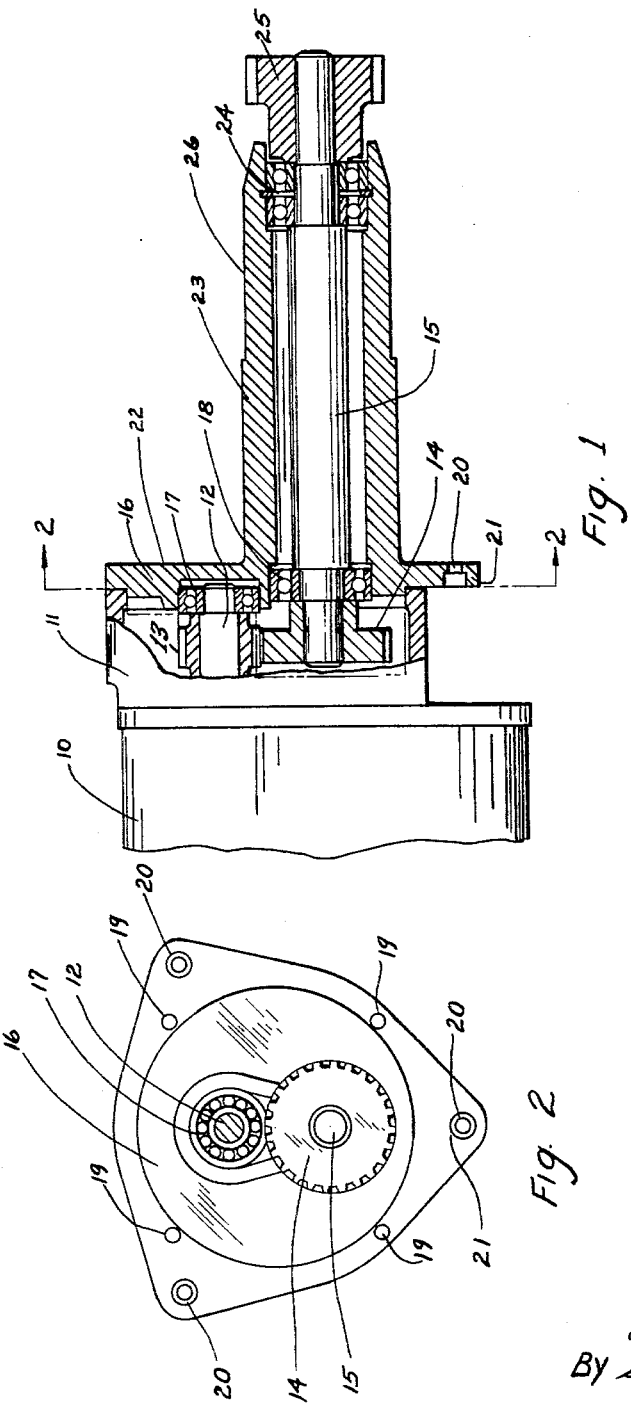
Inventor
Joachim K. Scholz
By George E. Szekely
Agent Jan. 18, 1966  J. K. SCHOLZ  3,229,542
POWER KNEE ELEVATE
Filed Dec. 30, 1963  2 Sheets-Sheet 2
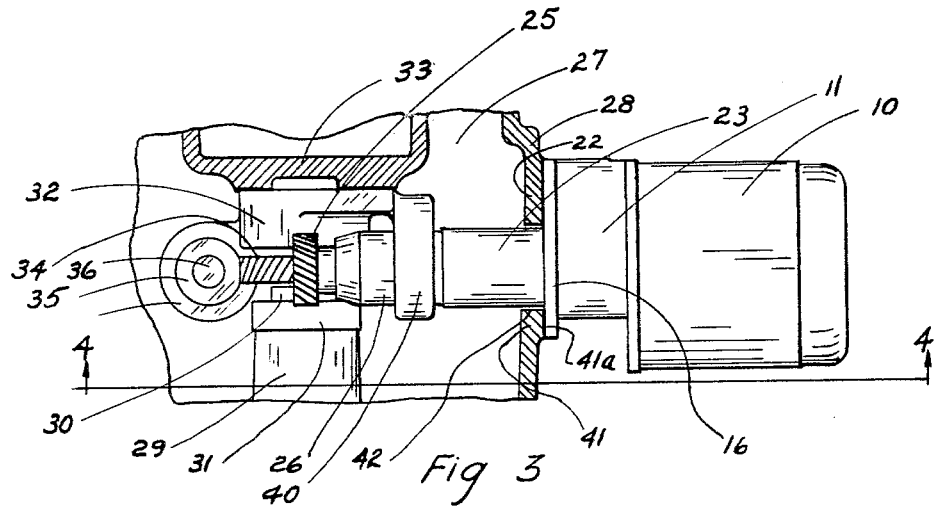
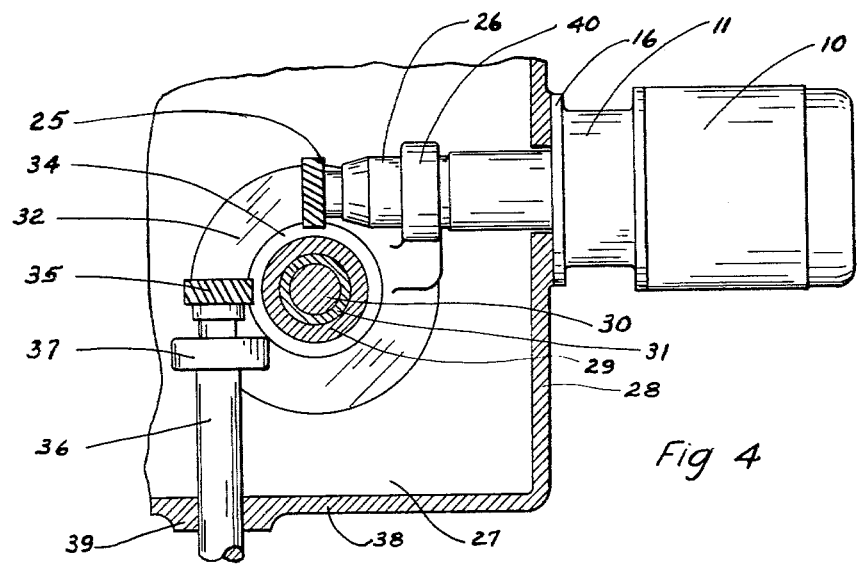
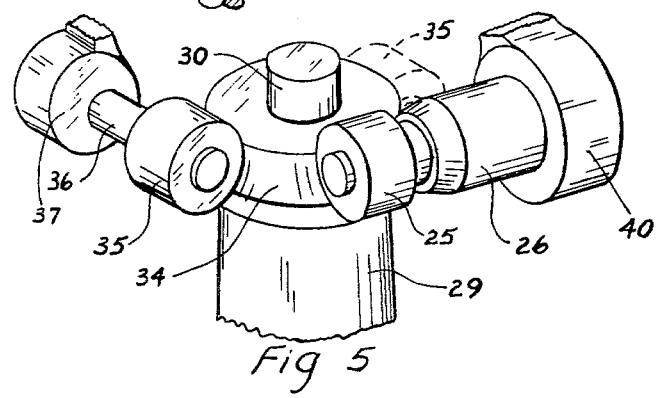
Inventor
Joachim K. Scholz
By George C. Szekely
Agent 3,229,542
POWER KNEE ELEVATE
Joachim K. Scholz, Racine, Wis., assignor to George Gorton Machine Co., Racine, Wis., a corporation of Wisconsin
Filed Dec. 30, 1963, Ser. No. 334,312
12 Claims. (Cl. 74—421)

This invention pertains to a packaged unit for power elevation of a milling machine knee, or similar machine component, together with a novel adaptation of such machine components to accommodate such unit.

Milling machine slides and other machine tool sliding components are often provided with power feeds. The drives may be electric or hydraulic motors, hydraulic cylinders, or the like. When several slides are interengaged, as with the table, saddle and knee of a milling machine, it may often be desirable to integrate the drive mechanisms, in such manner as to employ a single motor to feed two or more of the slides. Demand for convenience and versatility in set-up, positioning and operation of the machine for a wide variety of jobs usually dictates the incorporation of a full set of manual feed cranks, or the like, variable power feed speed for one or more slides, and selector means for feeding slides in combination or independently, as particular operations may require.

Universality is highly desirable for maximum utility of a costly machine tool. The accomplishment of this objective in a milling machine with power-fed table assembly has heretofore necessitated costly and complex arrangements of motors, transmissions, clutches, levers, cranks and other mechanisms. Unless reasonably regular, advantageous use can be made of the various feed options, the cost may not be justifiable. Not all users require the full range of options to the same extent. On the other hand, the manufacture of innumerable models or variants is manifestly uneconomical, particularly if substantial variance in basic construction is necessitated to accommodate different requirements.

Operating facility and economy can often be sufficiently achieved in a milling machine table assembly by powering the long and cross feeds only, that is, the table and saddle motions. Vertical power feed of the knee is somewhat less frequently demanded in many applications. Drive systems hitherto available do not provide economical construction for optional incorporation of powered knee, because transmissions and other mechanisms are so interrelated that radical changes are involved in varying the drive complex. Thus, many purchasers pay a substantial extra charge for a little used or superfluous power option. Furthermore, considerations of space, structural exigencies and first cost have generally dictated using a single electric motor for powering all three components in prior machines. In such case, the purchaser may incur not only an extra first cost for a little needed power knee option, but may be operating the power feeds uneconomically, as the normal power requirement is well below the capacity and peak efficiency of the drive motor.

It is an object of this invention to provide an optional powered drive for a milling machine knee.

It is a further object of this invention to provide a packaged motor and transmission unit which can be readily incorporated in a milling machine knee as original equipment, or can be readily installed subsequently by the user.

It is a still further object of this invention to provide an optional knee drive which is powered independently of the power unit or units for the table and saddle, or in the absence of such other power drives.

It is another object of my invention to provide a knee construction and drive arrangement which may optionally incorporate a power knee elevate with minimal variation of structure and moderate extra cost as compared with a knee equipped for manual elevate only.

Further objects and advantages of this invention will be apparent from the ensuing description and reference to the accompanying drawings, in which:

FIG. 1 is a view of the knee drive power unit, partially in front elevation and partially in longitudinal section;

FIG. 2 is a transverse section on line 2—2 of FIG. 1;

FIG. 3 is a vertical section through a portion of a milling machine knee, showing the power unit mounted thereon in position to operate the elevate mechanism, the unit being shown in rear elevation, that is, a view in a direction opposite to that of FIG. 1;

FIG. 4 is a horizontal section through the portion of a knee assembly, showing the power unit in bottom plan, as viewed on line 4—4 of FIG. 3;

FIG. 5 is a partial isometric view of the manual and power drives, as seen from the upper left and rearward of the rear elevation in FIG. 3, showing the relationship of the drive elements and the elevate screw, other structure being omitted.

Referring now to FIG. 1, numeral 10 represents an electric motor, which may be of any desired speed and electrical characteristic. For greatest advantage of this invention, motor 10 is a standard speed, reversible type, of a rating sufficient to elevate a knee assembly with its appurtenances, fixtures and work at a desired feed rate. For example, a ½ H.P. motor is suitable to elevate a representative milling machine knee at 20 inches per minute, facilitating rapid positioning of work. Reversal of the motor provides for lowering the knee under power.

Since a standard motor speed is too high for single reduction to a practical feed screw speed, the power unit must be provided with a multi-stage transmission, for which purpose a gear reducer is most suitable. A portion of the train is conveniently mounted in an extension or auxiliary case 11, integral with, or attached to, the housing of motor 10, thus comprising a gearmotor. Intermediate drive shaft 12 carries a pinion 13, which engages gear 14 on output shaft 15. Shaft 15 extends from case 11, parallel to shaft 12 and substantially coaxial with motor 10. Case 11 has a flanged or lugged cap 16, serving as a closure, as well as to support bearings 17 and 18, journaling shafts 12 and 15 respectively.

As best seen in FIG. 2, cap 16 is provided with a series of holes 19, to accommodate screws (not shown) for fastening cap 16 securely to case 11. Cap 16 also has a series of holes 20 located on a circle somewhat larger than the outside diameter of case 11, providing clearance for insertion of screws (not shown) to fasten the unit to a knee in a manner hereinafter described. For this purpose the cap 16 may be flanged, or provided with lugs 21, as shown. Outer face 22 is precision finished, flat and square to the axis established for shaft 15, the object of which will be later shown.

Cap 16 has an outwardly projecting, elongated barrel portion 23, which encloses shaft 15 for most of its length. At its outer end, barrel 23 is fitted with a heavy duty bearing, such as double-row ball bearing assembly 24. The portion of shaft 15 which projects beyond barrel 23 and bearing 24 holds a drive gear 25, whose hub serves as a bearing retainer. For a substantial distance along the outward portion of barrel 23 exterior surface 26 is turned or ground to precise concentricity with bearings 18, 24 and shaft 15, thereby insuring concentricity of surface 26 and gear 25.

Referring now to FIG. 3, the package power and transmission unit of FIGS. 1 and 2 is shown mounted in operating position upon a typical milling machine knee.

Only the related portion of the knee is shown, the housing being indicated generally by numeral 27. In conventional designation of direction relative to machine tools, the normal operator's station is usually considered "front" and other directions of position and motion are related thereto. In such terms of reference, the view of FIG. 3 is from the "rear" of the knee. However, for ease in following the description hereafter, directional terms, such as "left" or "right," refer to the view presented. Flexibility of arrangement is a major feature of this invention, the arrangement shown and described being merely illustrative of one practical selection. It will be apparent as the description proceeds that the power knee elevate unit may be variously located to "right," "left," "front," or "rear," as best suits the construction and operating requirements of a particular machine in which the unit is to be incorporated. The unit and its mounting provisions occupy relatively small space and adaptation involves little or no disturbance of other mechanisms with which the unit is to be associated. As a result, installation is readily conformable to practices of construction, operation and control prevailing in the manufacture and use of milling machines or other machine tools.

The knee is shown as equipped with usual manual elevate mechanisms. A yoke or pedestal 29 attaches to the machine column or base (not shown). A jack screw 30 threads into a nut 31 fastened to the top of pedestal 29. The upper shaft end of screw 30 is revolvably held in a bearing cage 32, which depends from an upper wall 33 of knee 27. A helical gear 34 is secured to the shaft of screw 30 below cage 32. Gear 34 is driven by a mating helical gear 35. As best seen in FIG. 4, gear 35 is secured to the end of a shaft 36, which is supported on an inboard hanger 37 and housing wall 38. Shaft 36 projects through boss 39 for reception of a handwheel or crank (not shown), whereby the operator can turn gear 35 to raise or lower the knee assembly. In FIG. 3, the parts are shown with the knee at substantially its lowest position. The construction of such manual elevate mechanisms being well known in the art, certain details have been omitted or shown only schematically; further discussion is unnecessary in describing this invention.

Provisions for adapting a knee in accordance with this invention comprise principally: a hanger 40, on which to support barrel 23, a mounting pad 41, and an opening 42, through which barrel 23 may be inserted into housing 27.

Hanger 40 forms a part of, or is attached to, housing 27. If housing 27 is cast, as in usual practice, hanger 40 may be conveniently formed as an appendage of cage 32, as shown. The eye of hanger 40 is finished to a close fit over surface 26 of barrel 23. The machining operation is best performed in correlation with the operations on bearing cage 32, whereby, through the use of suitable jigs, fixtures and guages, the axis of the hanger eye is precisely established relative to the axis of screw 30 and the position of gear 34. In this manner, it is assured that, upon passing barrel surface 26 through the eye of hanger 40, the axis of pinion 25 will lie in the tooth center-plane of gear 34 at the required pitch distance for correct mating. Hanger 40 is preferably positioned laterally as close as practicable to the axis of gear 34, to minimize bending stresses in shaft 15 (FIG. 1) and barrel 23. Such stresses result from the cantilever action of tooth pressure on pinion 25. As seen from FIG. 1, the placement of the pinion 25 close against bearing assembly 24, the substantial span between bearings 18 and 24, and the ample thickness of barrel 23 co-operate in holding stresses and distortion well within safe limits, yet involve relatively simple and inexpensive construction.

Pad 41 on knee wall 28 serves as a face mounting for the motor-transmission unit 10, 11. The exterior of pad 41 is accurately faced to a plane 41a, precisely parallel to the axis of elevate screw 30 and at a prescribed distance therefrom, so that when face 22 of case 11 is held against face 41a, the tooth center-plane of pinion 25 coincides with the axis of gear 34. Thus, the eye of hanger 40 and pad face 41a co-operate to establish the position co-ordinates of pinion 25 for correct mesh with gear 34. Inasmuch as practicable manufacturing tolerances may accumulate to discrepancies in face to axis measures which are greater than an acceptable variance, the dimensions and tolerances are preferably so selected that graded shimming may be used between faces 22 and 41a by way of compensation. However, the arrangement is such that complex adjustment mechanisms or costly break-in procedures are not required.

The provisions for reception of the power unit involve so little extra beyond the cost for manual elevate alone, that all knee assemblies for a given line of machines can be economically prepared for power elevate, which latter can be readily incorporated when shipped, or subsequently, at the purchaser's option. If the power elevate feature is not required in a given case, a simple cover plate (not shown) can be installed over opening 42 and the machine sold profitably at a fair price of machines with only manual elevate.

The power elevate unit is easily to install. Pinion 25 being of smaller diameter than barrel surface 26, the pinion and barrel are passed through opening 42 and the eye of hanger 40, the latter guiding the unit into proper gear meshing position as face 22 approaches pad face 41a. As previously noted, shims may be used between the faces, if necessary for precise adjustment of the unit's axial position. Holes 20 (FIG. 2) are aligned with corresponding studs or taps (not shown) in pad 41, and nuts, screws or other suitable fastenings (not shown) clamp the unit in place. Upon installation and connection of the electrical services and controls for motor 10, the power elevate is ready to operate.

Suitable electrical controls being well-known in the art, they are not shown or described herein. Motor 10 may be of any characteristic desired, conforming to available electrical service and adaptable to a selected control system. Typical controls comprise start, stop, reverse and jog, the buttons or selectors for which are preferably so located on the machine as to be within easy reach of the operator while attending the manual elevate crank and other machine controls.

Control facility is readily achieved by virtue of the power elevate system being operable independently of other drives and controls. The operator need not be concerned with clutches or complex sequencing manipulations. Prior power elevate arrangements, wherein drive and transmission elements of the power elevate are utilized in common or combination with the manual elevate and/or other feed drives and transmissions cannot be operated and controlled with the facility provided by this invention. For example, in setting up a typical milling operation, the operator may have the knee full down and table to one side while setting the work, to be clear of the spindle and cutter. The operator now wishes to bring the knee up and table over to cutting position, for which purpose he may start the knee elevate and table traverse, simultaneously or sequentially. With this invention, the operator need not shift gears or clutches, disengage manual control, or execute similar make-ready or intermediate steps necessary with prior power drive arrangements. The entire feed control system is thus more directly responsive to specific commands of the operator with minimum control manipulation. The table may be traversed fast or slow, jogged, stopped, reversed, power or manually fed, generally with only one hand, while the operator keeps his other hand free to control the elevate as may be required for power feed to approximate position, jogging close in, stopping power and manual fine positioning either independently or manually coordinated with table feed. Similar advantage in other operations will be apparent to those skilled in the operation of milling machines and other machine tools.

A further advantage of this invention in facilitating optimum control convenience is illustrated by FIG. 5. The full lines indicate the positions of manual and power drive components relative to the elevate screw, as arranged in FIGS. 3 and 4. In that arrangement, the manual shaft 36 is to the left of the elevate screw 30. If, in the design of a particular machine or model, the illustrated arrangement tends to crowd other mechanisms or controls exteriorly or interiorly of the knee, the shaft 36 with accompanying drive gear 38, hanger 37 and other appurtenances may be readily located in a position to the right of elevate screw 30, as indicated by broken lines, with due regard to using the appropriate gear hand. Similarly, the power feed unit may be to right or left. Even non-rectangular axis positions may be employed, should a particular assemblage so dictate. In sum, the packaged, powerfeed drive and transmission arrangement, afforded by this invention, simplifies the design, construction and use of powered multi-slide assemblies such as milling machine knees, while enhancing their versatility, efficiency and general utility, at modest unit cost.

For purposes of illustration this specification describes a preferred embodiment of the invention, but it will be understood that various changes may be made in form, construction and arrangement, without departing from the spirit and scope of invention as defined in the claims, which are as follows:

1. A machine tool component comprising: a housing; means engaging said housing for traversing said housing relative to an associated component, said means including a screw having a portion within said housing; a first gear on said portion; a hanger internally affixed to said housing in a position near said first gear; a unitary drive and transmission assembly externally mounted on a wall of said housing, having an output shaft projecting a substantial distance into said housing; a shaft support barrel carried by said assembly, enclosing said shaft for a substantial portion of its projection into said housing, said barrel being supported by said hanger; and a gear on said shaft outside of said barrel, meshing with said first gear to drive said screw and traverse said housing under power supplied through said assembly.

2. A machine tool component according to claim 1, wherein said hanger includes an eye closely fitted to a portion of said barrel, whereby to position the axis of said shaft relative to the axis of said screw.

3. A machine tool component according to claim 1, wherein a finished surface on said wall abuts said assembly at a predetermined distance from said screw, whereby to position said second gear along one principal co-ordinate axis in relation to said first gear.

4. A machine tool component according to claim 1, wherein said hanger includes an eye closely fitted to said barrel, establishing two principal co-ordinates of the position for said second gear, and a finished surface on said wall at a predetermined distance from said screw, establishing the third principal co-ordinate of the position for said second gear.

5. A unitary power feed drive for a milling machine knee or the like, comprising: a prime mover; a transmission driven by said prime mover; an output shaft driven by said transmission, projecting therefrom; a case for said transmission; a barrel projecting from said case and enclosing a portion of said shaft; bearings in said barrel journalling said shaft; and a drive element mounted on said shaft beyond said barrel.

6. A unitary power feed drive according to claim 5, wherein the exterior of said barrel is trued to precise concentricity with said shaft along a portion remote from said transmission.

7. A unitary power feed drive according to claim 5, wherein said prime mover is a motor having a housing, said case extending from said housing, and including an end cap for said case, said barrel being affixed to said cap.

8. A unitary power feed drive according to claim 5, wherein said prime mover is a motor having a housing, said case extending from said housing, and including an end cap for said case, exterior portions of said cap being in a plane at right angles to the axis of said shaft, said barrel being affixed to said cap.

9. A unitary power feed drive for a machine tool component, comprising: a gearmotor having a housing, including a gear case; a cap for said case; an output shaft driven by said gearmotor and projecting therefrom through said cap, a barrel enclosing a portion of said shaft; a first bearing in said cap journalling the inner end of said shaft; a second bearing in said barrel journalling the outer end of said shaft, remote from said first bearing; and a gear affixed to said shaft beyond said second bearing, but close thereto.

10. A unitary power feed drive according to claim 9, wherein the exterior face of said cap is provided with a plane portion precisely at right angles to the axis of said shaft, and the exterior of said barrel is provided with a cylindrical portion precisely parallel to the axis of said shaft.

11. A unitary power feed drive according to claim 9, wherein said gear abuts said second bearing.

12. A unitary power feed drive according to claim 9, wherein said cap is affixed to said case, said cap extending radially beyond said case to accommodate mounting means exteriorly of said case.

References Cited by the Examiner
UNITED STATES PATENTS

| | | | |
|---|---|---|---|
| 1,665,227 | 4/1928 | Smith | 74—625 X |
| 1,979,474 | 11/1934 | Klausmeyer et al. | |
| 2,592,920 | 4/1952 | Lovely et al. | |
| 2,634,623 | 4/1953 | Kron | 74—472 |
| 2,695,541 | 11/1954 | Mobius. | |

DON A. WAITE, *Primary Examiner.*

LEONARD H. GERIN, *Assistant Examiner.*